July 7, 1931.   C. BETHEL   1,813,141
RAILWAY MOTOR MOUNTING
Filed Jan. 25, 1928   4 Sheets-Sheet 1

INVENTOR
Claude Bethel.
BY
Wesley L. Carr
ATTORNEY

July 7, 1931.     C. BETHEL     1,813,141
RAILWAY MOTOR MOUNTING
Filed Jan. 25, 1928     4 Sheets-Sheet 2
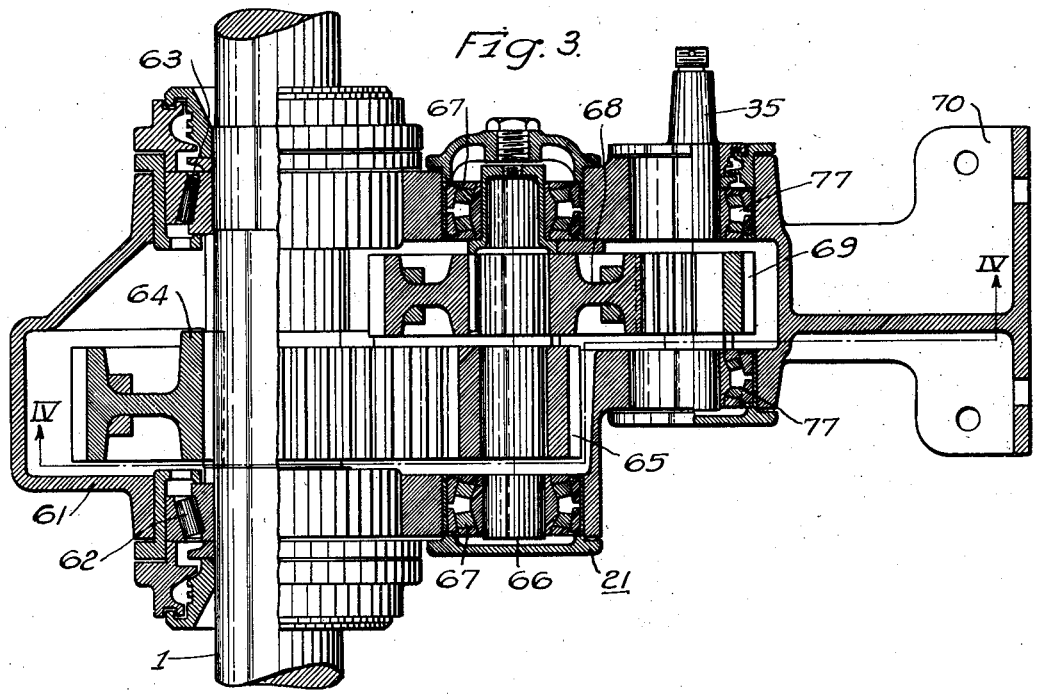
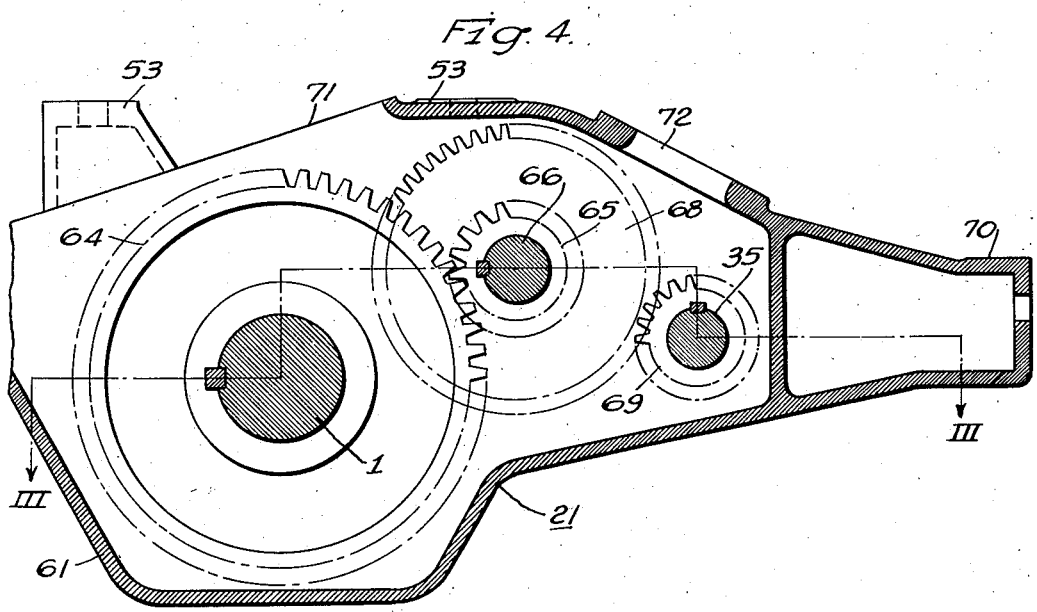
INVENTOR
Claude Bethel.
BY
ATTORNEY

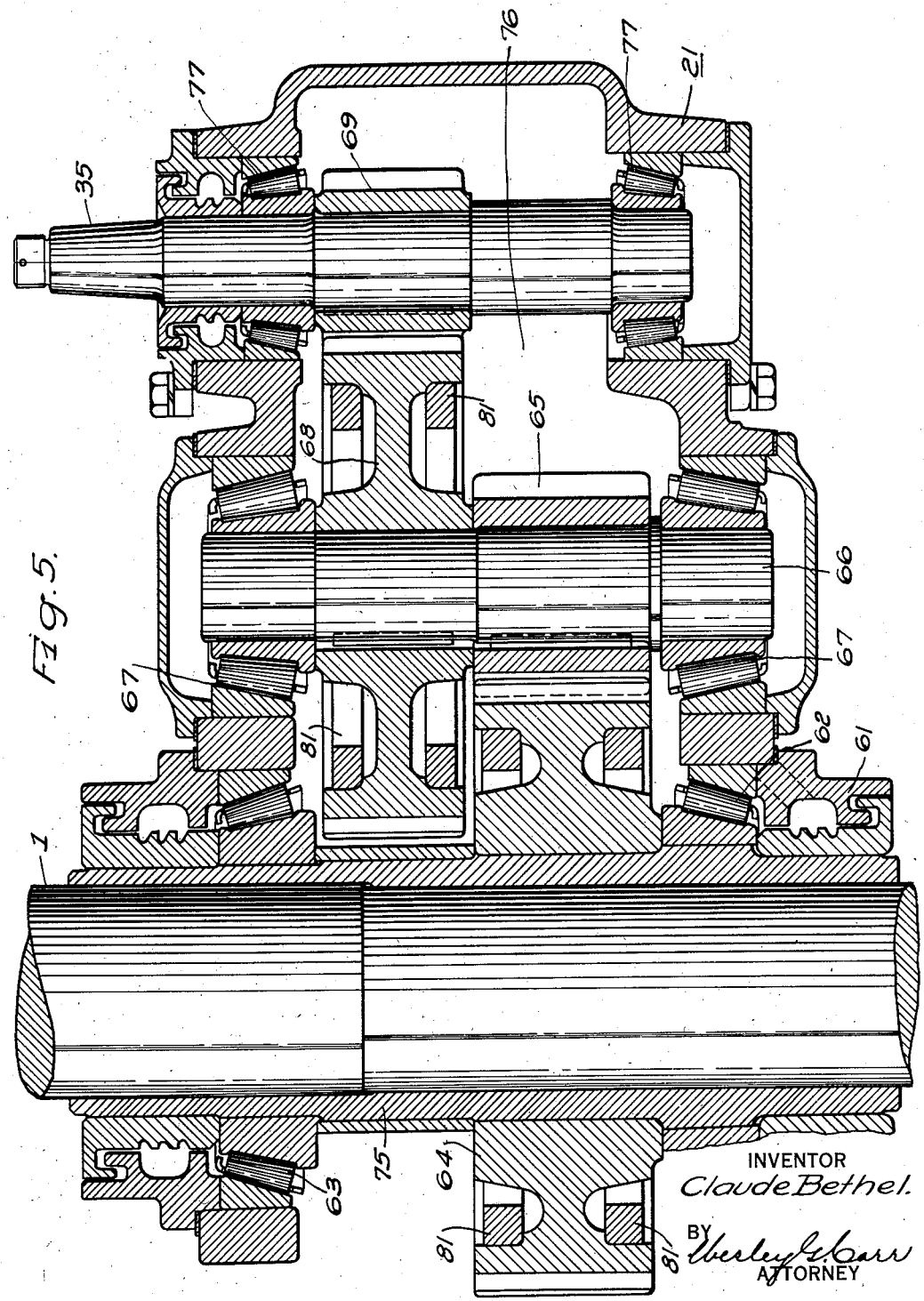

July 7, 1931. C. BETHEL 1,813,141
RAILWAY MOTOR MOUNTING
Filed Jan. 25, 1928 4 Sheets-Sheet 4
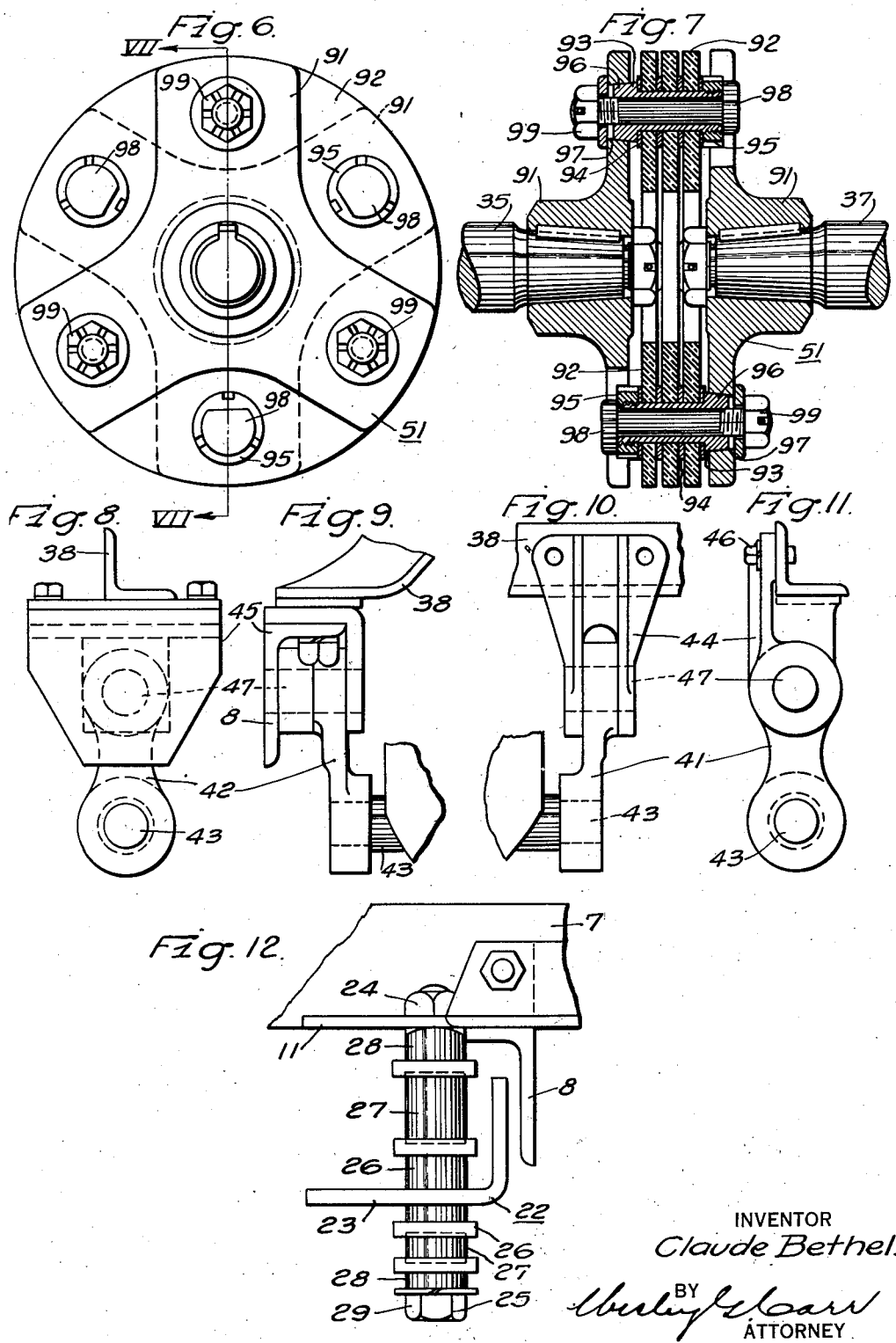
INVENTOR
Claude Bethel.
BY
ATTORNEY Patented July 7, 1931

1,813,141

UNITED STATES PATENT OFFICE

CLAUDE BETHEL, OF WILKINSBURG, PENNSYLVANIA, ASSIGNOR TO WESTINGHOUSE ELECTRIC & MANUFACTURING COMPANY, A CORPORATION OF PENNSYLVANIA

RAILWAY MOTOR MOUNTING

Application filed January 25, 1928. Serial No. 249,264.

My invention relates to railway-vehicle trucks and in particular to a drive mechanism for street-railway trucks.

Heretofore, it has been the general practice in motor-driven railway-vehicle trucks to suspend the driving motor directly from a wheel axle by means of journal bearings and to transmit power from the motor to the wheel axle by means of a gear wheel and a cooperating pinion. In railway-vehicle trucks, it is desirable that the ratio of speed reduction between the motor pinion and the driven gear wheel shall be made large in order that a small high-speed motor may be utilized for propelling the vehicle.

However, in the structures of the prior art, the size of the driven gear wheel is limited very definitely by the clearance that is permissible between the gear wheel and its case and the track or street surface over which the vehicle may be driven. Further, in order to increase the permissible motor speed, the driving wheels should be made as small as possible, which, in turn, causes the available clearance space beneath the driven gear wheel to be reduced. Therefore, in designing a truck, the motor speed is determined by a compromise between two factors, viz. the diameter of the driving wheel and the diameter of the driven gear wheel.

Therefore, it is not possible to design a single reduction drive mechanism for a street-railway vehicle to take full advantage of the maximum speed of which electric motors are capable. The result of the compromise design is that the motors are necessarily relatively large in proportion to the power developed by them. The relatively large size of the motor, together with the relatively large gear wheel that it has been found necessary to use, result in a truck structure of greater height and having wheels of greater diameter than is theoretically necessary for the amount of power developed.

In addition to the fact that the truck structures of the prior art are relatively high, they are found to be noisy in operation, for the reason that it is nearly impossible to maintain the gear wheel and pinion in proper meshing relation because of the wear that occurs in the various bearings after a short period of operation.

My present invention is directed to a railway-vehicle truck in which the motor is adapted to operate at a high speed and may, therefore, be small and light in weight in proportion to the power developed, when compared with motors heretofore utilized. Further, the transmission mechanism is so designed that the diameter of the driving wheels is not as seriously limited by the diameter of the gear wheels on the axles as is the case in the structures of the prior art. This is accomplished by utilizing a double-reduction gear drive mechanism to transmit power from the driving motor to the driven wheel axle.

It will, therefore, be seen that, by virtue of the double-reduction transmission mechanism, it is possible to utilize a drive motor of small dimensions for a given power output, and the truck structure need be only of sufficient height to accommodate the small drive motors.

It is an object of my invention to provide a railway-vehicle truck of comparatively low height and one that is adapted to be utilized in street-railway and similar vehicles having comparatively low floor levels.

Another object of my invention is to provide a railway-vehicle truck that shall be of relatively light weight, in proportion to the power developed.

A further object of my invention is to provide a railway-vehicle drive mechanism that shall be quiet and capable of operating for long periods of time with little attention.

Other objects of my invention will become evident when the following description is read in conjunction with the accompanying drawings in which:

Fig. 3 is a view, in section, of the unitary transmission mechanism shown in Fig. 1, taken along the line III—III of Fig. 4;

Fig. 4 is a view, in section, of the transmission mechanism taken along the line IV—IV of Fig. 3;

Fig. 5 is a sectional view of a modified form of the transmission mechanism;

Fig. 6 is a view, in end elevation, of the flexible coupling utilized for transmitting power from the motor to the transmission mechanism, shown in Fig. 1;

Fig. 7 is a view, in section, of the flexible coupling, taken along the line VII—VII of Fig. 6;

Fig. 8 is a view, in side elevation, of one of a pair of trunnion links for supporting the motor in the truck frame;

Fig. 9 is a view, in end elevation, of the trunnion link shown in Fig. 8;

Fig. 10 is a view, in end elevation, of the other trunnion link of the pair;

Fig. 11 is a view, in side elevation, of the trunnion link shown in Fig. 10; and Fig. 12 is a view, in end elevation, of the mechanism for fastening the unitary transmission mechanism to the truck frame.

Figure 1:
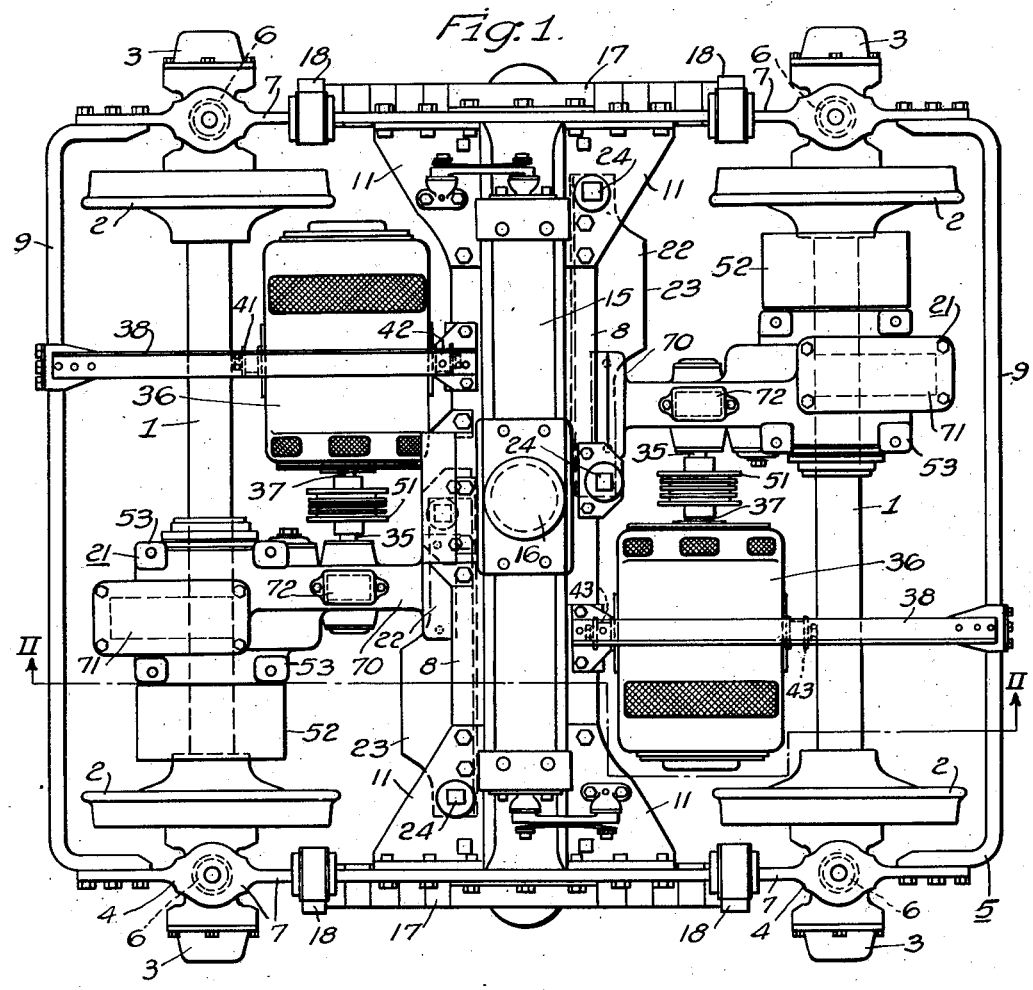
Figure 1 is a plan view of a railway-vehicle truck having a drive mechanism that embodies the principles of the invention.
Figure 2:
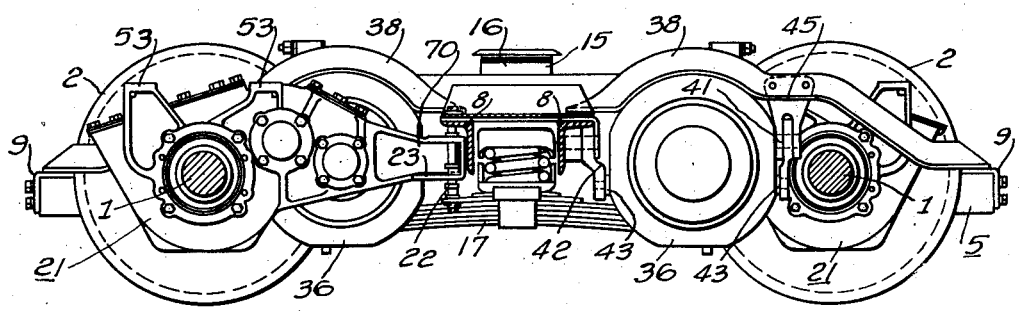
Fig. 2 is a view, in section, of the vehicle truck taken along the line II—II of Fig. 1.

As shown in Figs. 1 and 2, the railway-vehicle truck embodying the principles of my invention comprises, in general, a pair of wheel axles 1 that are provided with wheels 2 of relatively small diameter, the small wheels being permissible because of the compactness of the drive mechanism that constitutes the subject-matter of this invention.

The wheel axles 1 are provided, at their ends, with the usual journal boxes 3 disposed to slide vertically within pedestal jaws 4 that constitute a part of a truck structure 5 of standard design. The weight of the truck structure 5, together with any load that may be imposed upon it, is supported upon the journal bearings 3 by means of springs 6 that are interposed between the tops of the journal bearings 3 and the upper portions of the pedestal jaws 4, in the usual manner.

The truck structure 5 comprises a pair of side-frame members 7, in which are provided the pedestal jaws 4, and which are connected, near their center portions, by means of a pair of spaced transom members 8 and, at their ends, by means of cross pieces 9. In order that the truck structure may be further strengthened, angle pieces or gusset plates 11 are provided at the ends of the transom members 8 for securely bracing them to the side frame members 7.

To provide means for supporting the car body on the truck frame 5, a swing bolster 15 of the usual design is disposed between the spaced transom members 8 and is provided with a center bolt or king-pin connection 16. The bolster 15 is supported upon springs 17 at either end thereof which are, in turn, suspended from the side-frame members 7 by means of swing links 18, in the usual manner.

The drive mechanism to which my invention is directed comprises unitary transmission mechanisms, or gear units 21, that are mounted on each of the wheel axles 1 and are suspended from the transom members 8 by means of suspension mechanisms 22.

As shown in detail in Fig. 12, each suspension mechanism 22 comprises an angle piece 23 that extends parallel, and adjacent to, the truck transom 8, as shown in Fig. 12, and is supported therefrom by means of hangers 24. The hangers 24 are disposed at the ends of the angle piece 23 and are securely attached to the gusset plates 11 at one end and to the transom 8 at the other end by means of through-bolts 25. Socket members 26 are disposed to slide upon the bolt 25 and serve to engage the top and bottom of the angle piece 23. In order that the angle piece 23 may have a small degree of freedom of movement resilient members 27, which are preferably of rubber, are disposed around the bolt 25 and between the socket members 26 and cooperating socket members 28 that are in engagement with the head 29 of the bolt at one end and with the gusset plate 11 or the transom 8 at the other end. By reason of the resilient elements 27, the transmission mechanism 21 is secured to the truck transom 8 in a slightly yielding manner and, at the same time, held sufficiently rigid to insure proper disposition with respect to other elements of the truck structure.

The transmission mechanism 21 is provided with a pinion shaft 35 in order that it may be driven by a motor 36 that is disposed between the wheel axle 1 and the transom 8 and with its armature shaft 37 normally substantially parallel to the wheel axle 1 and in alinement with the pinion shaft 35.

The motor 36 is suspended from a longitudinally disposed angle-iron supporting member 38 that extends from the transom 8 to the end cross-member 9 by means of a pair of suspension links 41 and 42 that engage trunnion members 43 disposed on the respective sides of the motor 36 and at substantially the longitudinal center thereof. The link members 41 and 42 are suspended from brackets 44 and 45, respectively, that are secured to the angle iron 38 by means of bolts 46. The bracket 45 is further supported directly upon the transom member 8. Pivot pins 47 are inserted through the upper ends of the links 41 and 42 and through the bracket members 44 and 45 to provide pivotal connections between the links 41 and 42 and the truck member 5.

A flexible coupling 51 is provided between the ends of the armature shaft 37 and of the pinion shaft 35 to constitute a yielding connection therebetween for the transmission of power.

Referring to Figs. 1 and 2, it may be seen that the driving motor 36 is entirely resiliently supported upon the truck axles 1, inasmuch as the motor is suspended directly from the truck frame 5, and the frame is, in turn, mounted by means of the springs 6, upon the journal bearings 3. Further, the motor is so suspended, by means of the links 41 and 42, that it is free to move longitudinally in a transverse plane of the truck by swinging about the centers of the pivot pins 47 and also free to turn in the same plane about the center of its trunnions 43. The transmission mechanism 21, on the other hand, is journalled directly upon the wheel axle 1 and tends to move in accordance with the motion of the axle. However, the end of the transmission mechanism 21 that is secured to the suspension bar 23 is held substantially stationary with respect to the truck transom 8.

Hence, the pinion shaft 35 will tend to move only approximately one-half the distance that the wheel axle moves with respect to the truck frame 5 when the truck is operating.

Since the motor 36 is suspended in such manner that it is free to move, in response to forces exerted upon it, in a vertical transverse plane of the truck, it will be seen that the armature shaft 37 will tend to follow the motions of the pinion shaft 35. Whatever angular mis-alinement occurs between the armature shaft 37 and the pinion shaft 35 will be readily taken care of by the flexible coupling 51.

A brake drum 52 is provided on each of the wheel axles 1 for cooperating with a standard clasp brake mechanism, (not shown), that may be mounted upon the top of the transmission mechanism 21 by means of supporting pads 53.

The transmission mechanism 21 comprises, in general, a unitary housing member 61 that is journalled upon one of the wheel axles 1 by means of antifriction journal bearings 62 and 63. The double-reduction power-transmission gear train that constitutes the means for transmitting power from the motor 36 to the wheel axle 1, comprises a gear wheel 64 that is securely mounted on the wheel axle 1 between the journal bearings 62 and 63 and within the gear casing 61. A pinion 65, disposed to mesh with the gear wheel 64, is mounted on a countershaft 66 that is journalled in the gear casing 61 by means of antifriction bearings 67. The countershaft 66 is disposed between the wheel axle 1 and the pinion shaft 35 that is journalled in the casing 61 by means of antifriction bearings 77 in parallel relation thereto. A gear wheel 68 is mounted adjacent to the pinion 65 on the countershaft 66 to mesh with a pinion 69 on the pinion shaft 35.

In order to provide for attaching the gear casing 61 to the suspension bar 23, a bracket portion 70 is provided on the end thereof farthest from the wheel axle 1. To provide access to the interior of the gear casing 61, an opening 71 through which the gear wheels may be removed and an opening 72 for inspecting the pinion 69 are provided in the upper portion thereof.

In the modification of my transmission mechanism shown in Fig. 5, the gear casing 61 is journalled by means of the antifriction bearings 62 and 63 on a sleeve 75 that also serves as a supporting member for the gear wheel 64. By utilizing the construction shown, the entire transmission mechanism 21 may be assembled and properly adjusted at the factory and applied to a railway vehicle, as a unit, by simply pressing the sleeve 75 on the wheel axle 1. In order to dismantle the transmission mechanism shown in Fig. 5, it is first removed as a unit from the wheel axle 1. The sleeve 75 may then be pressed out of the gear wheel 64 and the bearings 62 and 63, thereby allowing the gear wheel 64 to be removed through the opening 71 in the gear casing 61. The bearings 62 and 63 may then be withdrawn from the sides of casing 61.

In order to remove the counter shaft 66, the outer portion of the antifriction bearings 67 are first removed from the casing 61, and the countershaft 66 is then moved longitudinally to bring the gear wheel 68 into the position formerly occupied by one side of the gear wheel 64. This movement of the gear wheel 68 is permitted by providing a space 76 adjacent the pinion shaft 35 to correspond to the space normally occupied by the gear wheel 64. After the gear wheel 68 has been moved to this position, the inner portion of the bearing 67 adjacent to the pinion 65 may be removed from the shaft 66 by a suitable pulling tool.

Pressure may then be applied to the side of the pinion 65 and to the farther end of the countershaft 66 to press it out of the pinion 65 and the gear wheel 68. The pinion 65 and the gear wheel 68 may then be removed from the casing 61 through the opening 71. Substantially this same process may be repeated for removing the pinion shaft 35 and the pinion 69, although it may be desirable to simply remove the antifriction bearings 77 from the casing 61 and withdraw the pinion shaft 35 and the pinion 69 as a unit.

It will be noted that the gear wheels 64 and 68, as shown in Figs. 3 and 5, are each provided with a pair of rings 81 of suitable material, such as cast iron, for the purpose of deadening the sound of the gear wheels, as more fully set forth in the copending application of R. E. Peterson filed September 19, 1928, Serial No. 306,816 and assigned to the Westinghouse Electric & Manufacturing Company.

Referring to Figs. 6 and 7, the flexible coupling 51 that serves to transmit power from the motor 36 to the transmission mechanism 21, comprises hub portions 91 that are secured to the armature shaft 37 and the pinion shaft 35, respectively, by means of taper fits, or other suitable connection. The flexible element of the coupling 51 comprises a plurality of rings, or discs 92, preferably of non-metallic material that are mounted on a plurality of sleeves 93, together with spacing washers 94 that serve to maintain clearance spaces between the adjacent discs 92, the whole being securely assembled by means of nuts 95 that are threaded on the ends of the sleeves 93. The sleeves 93 are further provided with tapered ends 96 that are disposed to engage correspondingly tapered openings 97 in the hub members 91, as shown in Figs. 6 and 7. The tapered portions 96 of the sleeves 93 are so disposed that successive sleeves engage the hub members 91 alternately. Bolts 98 having nuts 99 are provided for securely fastening the sleeves 93 to the hub members 91.

From the foregoing description and explanation, it will be readily seen that the invention provides a railway-vehicle truck that is low and light in weight and which accommodates a motor capable of developing a great amount of power, in comparison with the motor which could be housed by trucks, of similar size which have heretofore been provided. Further, it is obvious that the transmission mechanism herein disclosed is of very rugged and compact construction and is designed to operate very quietly for the reason that the gears are maintained in accurate alinement by means of the antifriction bearings and are operated in an oil bath.

Although I have described a specific embodiment of the invention, it will be obvious to those skilled in the art that various modifications may be made in the type of gear-wheels utilized and in the particular shapes and details of the parts that constitute the transmission mechanism without departing from the spirit and scope of the invention as defined in the appended claims.

I claim as my invention:

1. In a railway-vehicle truck, in combination, a unitary gear-reduction driving mechanism, said driving mechanism being suspended at one side on the truck axle and at the other side on the truck transom, a system of suspension links, a motor for driving the truck, said motor being suspended from the truck frame by means of the suspension links, and flexible means for transmitting power from the motor to the gear mechanism.

2. A railway-vehicle truck comprising a pair of wheel axles, a truck frame resiliently mounted on the wheel axles, a unitary gear-reduction mechanism carried by each of the wheel axles, a motor for driving each of the wheel axles by means of the gear-reduction mechanism, said motor being provided with trunnions on the respective sides thereof, links for cooperating with the trunnions, said links being pivotally suspended from the truck frame in such manner that the motor is permitted to move relative thereto, and a flexible coupling for transmitting power from the motor to the reduction mechanism.

3. A railway-vehicle truck comprising wheel axles, a truck frame journalled on the wheel axles, a unitary gear-reduction drive mechanism carried by each of the wheel axles and resiliently suspended from the truck frame, a driving motor disposed parallel to each of the wheel axles, swing links for suspending the motor from the truck frame, and flexible couplings between the motors and the gear-reduction mechanisms for transmitting power.

4. A railway-vehicle drive mechanism comprising a wheel axle, a sleeve carried by the wheel axle, a unitary housing member journalled on the sleeve, a gear wheel mounted on the sleeve within the housing, a counter shaft journalled in the housing and provided with a pinion for engaging the gear wheel on the sleeve, a gear wheel mounted on the counter shaft, a pinion shaft journalled in the housing parallel to the wheel axle, and a pinion mounted on the pinion shaft for engaging the gear wheel on the counter shaft.

5. A railway-vehicle drive mechanism comprising a unitary housing, a sleeve extending through the housing and journalled therein for receiving a wheel axle, a counter shaft journalled in the housing parallel to the sleeve, a pinion shaft journalled parallel to the counter shaft, a pinion on the pinion shaft, a gear wheel carried by the counter shaft for cooperating with the pinion, a pinion also carried by the counter shaft, and a gear wheel carried by the sleeve for cooperating with the pinion on the counter shaft, the whole constituting a unitary gear-reduction mechanism that may be readily placed on or removed from a wheel-axle as a unit.

In testimony whereof, I have hereunto subscribed my name this 23rd day of January, 1928.

CLAUDE BETHEL.